(12) United States Patent
Liang et al.

(10) Patent No.: US 10,967,587 B2
(45) Date of Patent: Apr. 6, 2021

(54) COMPOSITE MATERIALS INCLUDING CARBON NANOTUBE YARNS AND METHODS

(71) Applicant: The Florida State University Research Foundation, Inc., Tallahassee, FL (US)

(72) Inventors: Zhiyong Liang, Tallahassee, FL (US); Gerald Horne, Tallahassee, FL (US); Ayou Hao, Tallahassee, FL (US); Claire Jolowsky, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 16/539,130

(22) Filed: Aug. 13, 2019

(65) Prior Publication Data
US 2020/0061942 A1    Feb. 27, 2020

Related U.S. Application Data

(60) Provisional application No. 62/718,143, filed on Aug. 13, 2018.

(51) Int. Cl.
| | | |
|---|---|---|
| *B29C 70/56* | (2006.01) | |
| *D02G 3/16* | (2006.01) | |
| *C08J 5/00* | (2006.01) | |
| *B29K 307/04* | (2006.01) | |

(52) U.S. Cl.
CPC .............. *B29C 70/56* (2013.01); *C08J 5/005* (2013.01); *D02G 3/16* (2013.01); *B29K 2307/04* (2013.01); *C08J 2379/08* (2013.01); *D10B 2101/122* (2013.01)

(58) Field of Classification Search
CPC ....... B29C 70/56; B29C 53/581; B29C 55/00; D02J 1/22; D02G 3/16; H01B 5/16
USPC .......................... 264/402; 252/500, 510, 511
See application file for complete search history.

(56) References Cited

U.S. PATENT DOCUMENTS

| | | | | |
|---|---|---|---|---|
| 2008/0170982 A1* | 7/2008 | Zhang | ............... | G01L 1/2287 |
| | | | | 423/447.3 |
| 2012/0282453 A1* | 11/2012 | Wang | ................. | B29C 70/62 |
| | | | | 428/299.1 |

FOREIGN PATENT DOCUMENTS

| | | | | |
|---|---|---|---|---|
| KR | 20140017335 A | * | 2/2014 | ............... D02G 3/04 |

OTHER PUBLICATIONS

Li "Continuously prepared highly conductive and stretchable SWNT/MWNT synergistically composited electrospun thermoplastic polyurethane yarns for wearable sensing." J. Mater. Chem. C, 2018, 6, 2258-2269 (online Nov. 24, 2017) (Year: 2017).*

Cheng, et al., "High Mechanical Performance Composite Conductor: Multi-Walled Carbon Nanotube Sheet/Bismaleimide Nanocomposites," Advanced Functional Materials, (2009), vol. 19, pp. 3219-3225.

(Continued)

*Primary Examiner* — Tri V Nguyen
(74) *Attorney, Agent, or Firm* — Eversheds Sutherland (US) LLP

(57) ABSTRACT

Methods of forming composite materials, which may include filament winding two or more carbon nanotube yarns to form one or more material layers, contacting the yarns with a resin, and applying one or more stretching forces to the material layers. Composite materials also are provided.

15 Claims, 9 Drawing Sheets

(56) References Cited

OTHER PUBLICATIONS

Cheng, et al., "Functionalized Carbon-Nanotube Sheet/Bismaleimide Nanocomposites: Mechanical and Electrical Performance Beyond Carbon-Fiber Composites," Carbon-Nanotube Sheet/Bismaleimide Nanocomposites, Small (2010), vol. 6, No. 6, pp. 763-767.
Downes, et al., "Strain-Induced Alignment Mechanisms of Carbon Nanotube Networks," Advanced Engineering Materials, (2015), vol. 17, No. 3, pp. 349-358.
Han, et al., "Bio-Inspired Aggregation Control of Carbon Nanotubes for Ultra-Strong Composites," Nature Scientific Reports, (2015), pp. 1-9.
Jiang, et al., "Mechanical, Electrical and Thermal Properties of Aligned Carbon Nanotube/Polyimide Composites," Elsevier, Composities: Part B 56 (2014), pp. 408-412.
Wang, et al., "Mechanical and Electrical Property Improvement in CNT/Nylon Composites Through Drawing and Stretching," Elsevier, Composites Science and Technology 71 (2011), pp. 1677-1683.
Yu, et al., "Tensile Loading of Ropes of Single Wall Carbon Nanotubes and their Mechanical Properties," Physical Review Letters, vol. 84, No. 24 (2000), pp. 5552-5555.

* cited by examiner

US 10,967,587 B2

COMPOSITE MATERIALS INCLUDING CARBON NANOTUBE YARNS AND METHODS

CROSS-REFERENCE TO RELATED APPLICATIONS

This application claims priority to U.S. Provisional Patent Application No. 62/718,143, filed Aug. 13, 2018, which is incorporated herein by reference.

STATEMENT REGARDING FEDERALLY SPONSORED RESEARCH AND DEVELOPMENT

This invention was made with government support under contract numbers FA8650-16-M5050 and FA9550-17-1-0005 awarded by the Air Force Office of Scientific Research. The government has certain rights in the invention.

BACKGROUND

Composite materials having high strength-to-weight ratios, as well as one or more other desirable functional properties may have a number of applications, including applications in the aerospace industry. Research of carbon fiber-reinforced composites, however, is beginning to show diminishing returns, because, in many instances, the properties of the composites are approaching the performance limitations of the individual constituent materials of current reinforcement fibers and resin matrices.

Efforts have been made to overcome these limitations by exploring and developing nanostructured composites. For example, novel nanoscale building block materials, such as carbon nanotubes (CNTs), graphene, and nanocellulose materials may demonstrate desirable structural and transport properties compared to the state-of-the-art (SOTA) fibers and their composites.

CNTs can have unusually high tensile strength (e.g., ~150 GPa), high modulus (e.g., ~1 TPa), large aspect ratio, low density, good chemical and environmental stability, and/or high thermal and electrical conductivity; thus making CNTs potentially attractive fillers and/or reinforcements to enhance the mechanical, thermal, and/or electrical properties of materials, such as polymer matrices.

However, the incorporation of CNTs in composites has mainly been at relatively low concentrations in polymer-based matrices, due at least to poor dispersion. Incorporation of CNTs has improved electrical and/or mechanical properties of some materials, but most, if not all, of the materials have included only a low mass fraction (e.g., 0.05-5 wt. %) of CNTs. This is most likely due to poor interfacial interaction(s) between CNTs and matrix materials, and the difficulty of aligning CNTs at low volume fractions.

As manufactured, CNTs typically do not adequately bond to chemicals and often are in agglomerated "bundles" that may include multiple species of CNTs, as well as potentially significant portions of residual catalysts and/or amorphous carbon. It can be difficult, therefore, to assemble CNTs efficiently to form macroscale CNT structures and to increase, maximize, or fully utilize the outstanding mechanical properties of CNTs. In addition, the manufactured composite sizes (especially thicknesses) usually are very small (e.g., a few microns).

One of the difficulties that prevents CNT composites from being comparable to the SOTA aerospace-grade carbon fiber composites may include the fabrication difficulties that can be faced when producing composites with a relatively high concentration of ultra-long CNTs.

CNT yarns are formations of ultra-long CNTs entangled together and bulk-oriented in the same direction. Although CNT yarns have been used in some composite materials, the efforts to do so have been limited due to one or more of the foregoing difficulties.

Recently, a method for manufacturing relatively large samples of highly aligned and densely packed CNT/Bismaleimide (BMI) composite samples with ultra-high mechanical properties was demonstrated by Y. Han et al., "Bio-Inspired Aggregation Control of Carbon Nanotubes for Ultra-Strong Composites," Sci. Rep., vol. 5, p. 11533, June 2015, which is incorporated herein by reference.

There remains a need, however, for composite materials that may include relatively high concentrations of CNTs, and may have one or more desirable properties, such as an extra-high modulus and/or adequate interfacial shear properties. There also remains a need for methods of producing composite materials that are scalable and capable of producing aerospace-quality composite materials having one or more advanced structural or multifunctional properties using CNT yarns, including commercially available CNT yarns, and a resin matrix, including an aerospace-qualified resin matrix. There also remains a need for composite materials for which resin-dominated tests such as flexural, lateral compressive, and/or short beam shear can be performed.

BRIEF SUMMARY

Provided herein are composite materials and methods of making composite materials that address one or more of the foregoing needs, including composite materials that include CNT yarns and a resin, and have one or more desirable properties, such as strength and/or electrical conductivity. In some embodiments, the methods herein include a stretch-assist CNT filament winding process, a heat-assisted multiple-step stretching process, and a curing-under-tension process, which may potentially (i) be easy to scale-up, (ii) be relatively inexpensive, and/or (iii) use commercially available CNT materials.

In some embodiments, the methods provided herein can produce relatively inexpensive and/or scalable composite materials that (i) have a high concentration of CNTs (e.g., about 60 wt. %), (ii) achieve high performance, and/or (iii) have desirable dimensions (e.g., 4"×4"×0.1") with a relatively high degree of alignment and packing for potential structural applications.

In one aspect, methods of forming composite materials are provided. In some embodiments, the methods include providing two or more carbon nanotube yarns; filament winding the two or more carbon nanotube yarns to form a first material layer that includes the two or more carbon nanotube yarns; contacting the two or more carbon nanotube yarns with a resin during at least a portion of the filament winding; applying a first stretching force to the first material layer to form a stretched first material layer, wherein the first stretching force is effective to extend a length of the first material layer by about 2% to about 3%; removing the first stretching force from the stretched first material; applying a second stretching force to the stretched first material layer to form an aligned first material layer, wherein the second stretching force is effective to extend a length of the stretched first material layer by about 2% to about 3%; removing the second stretching force from the aligned first material layer; and applying a third stretching force to the aligned first material layer, wherein the third stretching force is effective to extend a length of the aligned first material layer by about 0.1% to about 3%, and curing the resin at least partially while the third stretching force is applied to the aligned first material layer to form the composite material.

In some embodiments, the methods include providing two or more carbon nanotube yarns; filament winding the two or more carbon nanotube yarns to form a first material layer that includes the two or more carbon nanotube yarns; contacting the two or more carbon nanotube yarns with a resin during at least a portion of the filament winding; applying a first stretching force to the first material layer for about 5 minutes to about 15 minutes to form a stretched first material layer, wherein the first stretching force is effective to extend a length of the first material layer by about 2% to about 3%, and the first stretching force is applied while the first material layer is exposed to a temperature of about 50° C. to about 90° C.; removing the first stretching force from the stretched first material layer for about 1 minute to about 3 minutes; applying a second stretching force to the stretched first material layer for about 5 minutes to about 15 minutes to form an aligned first material layer, wherein the second stretching force is effective to extend a length of the stretched first material layer by about 2% to about 3%, and the second stretching force is applied while the stretched first material layer is exposed to a temperature of about 50° C. to about 90° C.; removing the second stretching force from the aligned first material layer; and applying a third stretching force to the aligned first material layer, and curing the resin while the third stretching force is applied to the aligned first material layer to form the composite material, wherein the third stretching force is effective to extend a length of the aligned first material layer by about 0.1% to about 3%.

In another aspect, composite materials are provided. In some embodiments, the composite materials include at least one material layer, the material layer including two or more substantially aligned carbon nanotube yarns; and a cured resin, wherein the cured resin at least partially penetrates the two or more substantially aligned carbon nanotube yarns; wherein the two or more substantially aligned carbon nanotube yarns are present in the composite material at an amount of about 50% to about 75% by weight of the composite material.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
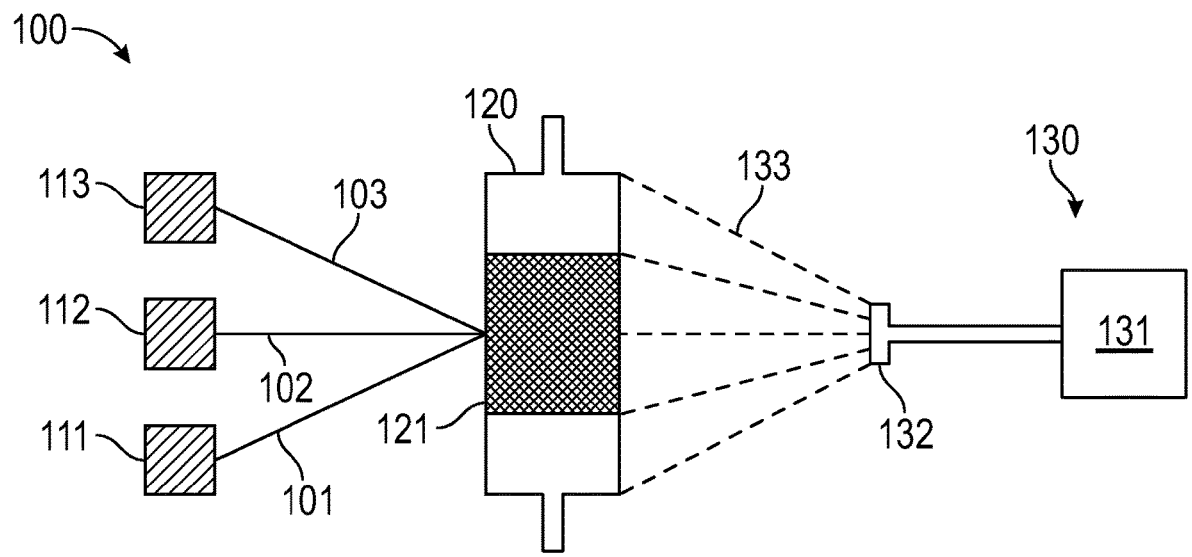
FIG. 1A depicts an embodiment of a system for filament winding.

Provided herein are composite materials and methods of making composite materials, wherein the composite materials include CNT yarns and a resin.

Methods

In some embodiments, the methods provided herein include filament winding two or more carbon nanotube yarns to form a first material layer that includes the two or more carbon nanotube yarns. In some embodiments, the methods also include filament winding the two or more carbon nanotube yarns to form a second material layer including the two or more carbon nanotube yarns, wherein the second material layer is arranged on and in contact with the first material layer. Generally, the two or more carbon nanotube yarns may be wound to form any desired number of layers (e.g., 2 to 50 layers, 2 to 40 layers, 2 to 30 layers, 2 to 20 layers, 2 to 10 layers, etc.). The number of material layers may be selected, for example, to achieve a desired dimension, such as thickness.

The two or more carbon nanotube yarns may include spun carbon nanotube yarns, unspun carbon nanotube yarns, or a combination thereof.

The filament winding may allow for the two or more CNT yarns to be oriented in a desired direction. The orientation of the two or more CNT yarns of two or more material layers may be the same or different. The two or more CNT yarns may include any number of CNT yarns; for example, 2 to 30 yarns, 2 to 20 yarns, 2 to 10 yarns, etc.

In some embodiments, the filament winding includes winding the two or more carbon nanotube yarns around a stretching tool with the aid of an automatic filament winder.

In some embodiments, an automatic filament winder is used, and CNT yarn is wound around a stretching tool, which may be used to stretch a material layer and/or the CNT yarns. For example, a stretching tool may apply a stretching force to the two or more CNT yarns during the filament winding.

In some embodiments, the methods provided herein include contacting the two or more carbon nanotube yarns with a resin during at least a portion of the filament winding.

In some embodiments, the contacting of the two or more carbon nanotube yarns with the resin at least partially penetrates the two or more carbon nanotube yarns with the resin. A resin "penetrates" a carbon nanotube yarn when at least a portion of the resin is disposed beneath an outer surface of a carbon nanotube yarn. When substantially all of the interstitial spaces of a carbon nanotube yarn include a resin, the resin has "impregnated" the carbon nanotube yarn. The resin generally may include any curable material, such as a curable polymeric material. In some embodiments, the resin includes a bismaleimide. The resin may be mixed with a liquid, such as acetone.

The contacting of the two or more CNT yarns with the resin may be achieved by any technique. For example, the resin, or resin and liquid mixture, may be sprayed, brushed, poured, etc. at and/or onto the two or more CNT yarns. In some embodiments, during at least a portion of the winding process, the CNT yarns are impregnated with a resin-containing liquid to make CNT pre-pregs.

Mechanical stretching of CNT yarns can be used to improve alignment of the CNTs of the CNTs yarns, the CNT yarns of a composite material, or a combination thereof. In some embodiments, the stretching process of the methods herein is a multiple-step process that includes stretching one or more material layers in small increments (e.g., 2-3% strain per step, calculated based on initial length of the wound CNT panel of one or more material layers) for multiple steps, which may provide a better stretching ratio than a single step stretching process (e.g., 15-20% total strain). In some embodiments, the multiple-step stretching is performed on a CNT panel of one or more material layers to which heat is applied, and the heat may decrease the viscosity of the resin, thereby allowing a resin to act as a lubricant.

In some embodiments, a stretching force (e.g., first and/or second stretching force) is held for 10 minutes after 2-3% of extension, followed by 2 minutes of relaxation with no force. This may result in increased alignment, which can improve the mechanical and/or electrical properties of the composite materials, thereby possibly resulting in composite materials having properties comparable to those of state-of-the-art IM7 carbon fiber/bismaleimide resin composites. In some embodiments, the stretching process is capable of being scaled up to the force and size limits of any mechanical tester with tensile test fixtures.

In some embodiments, the methods include applying a first stretching force to one or more material layers, wherein the first stretching force is effective to extend a length of the one or more material layers by about 2% to about 3%. In some embodiments, the first stretching force is effective to extend a length of the one or more material layers by about 2%. In some embodiments, the second stretching force is effective to extend a length of the one or more material layers by about 3%.

As used herein, the phrase "extend a length" refers to a permanent or temporary increase in any dimension of a material, particularly a dimension aligned with a force applied to the material. Therefore, the "length" of a material that is extended by a stretching force is not necessarily the longest dimension of a material.

The first stretching force generally may be applied for any time and/or at any temperature effective to extend a length of the one or more material layers. In some embodiments, a first stretching force is applied (i) to one or more material layers for about 1 minute to about 30 minutes, and/or (ii) while the one or more material layers are exposed to a temperature of about 40° C. to about 100° C. In some embodiments, a first stretching force is applied (i) to one or more material layers for about 5 minutes to about 15 minutes, and/or (ii) while the one or more material layers are exposed to a temperature of about 50° C. to about 90° C. The methods provided herein may include removing a first stretching force from the one or more material layers before a second stretching force is applied. In some embodiments, the removing of the first stretching force includes removing the first stretching force for about 1 minute to about 3 minutes. The first stretching force, however, generally may be removed for any period prior to the application of a second stretching force.

In some embodiments, the methods herein include applying a second stretching force to one or more material layers, wherein the second stretching force is effective to extend a length of the one or more material layers by about 2% to about 3%. In some embodiments, the methods herein include applying a second stretching force to one or more material layers, wherein the second stretching force is effective to extend a length of the one or more material layers by about 2%. In some embodiments, the methods herein include applying a second stretching force to one or more material layers, wherein the second stretching force is effective to extend a length of the one or more material layers by about 3%.

The second stretching force generally may be applied for any time and/or at any temperature effective to extend a length of the one or more material layers. In some embodiments, a second stretching force is applied (i) to one or more material layers for about 1 minute to about 30 minutes, and/or (ii) while the one or more material layers are exposed to a temperature of about 40° C. to about 100° C. In some embodiments, a second stretching force is applied (i) to one or more material layers for about 5 minutes to about 15 minutes, and/or (ii) while the one or more material layers are exposed to a temperature of about 50° C. to about 90° C.

The methods provided herein may include removing a second stretching force from the one or more material layers before a third stretching force is applied. In some embodiments, the removing of the second stretching force includes removing the second stretching force for about 1 minute to about 3 minutes. The second stretching force, however, generally may be removed for any period prior to the application of a third stretching force.

In some embodiments, the methods provided herein include applying a third stretching force to the one or more material layers, and curing the resin at least partially while the third stretching force is applied to the one or more material layers to form the composite material, wherein the third stretching force is effective to extend a length of the one or more material layers by about 0.1% to about 3%.

In some embodiments, the methods provided herein include at least one CNT purification step, which may eliminate or reduce the amounts of residual catalyst and/or amorphous carbon, and/or facilitate the removal of manufacturer-added chemicals during CNT synthesis.

In some embodiments, the methods provided herein include a CNT surface treatment, such as chemical functionalization and/or plasma etching, which may improve CNT and resin interfacial bonding.

In some embodiments, the methods provided herein include oxidizing a surface of the two or more CNT yarns by plasma oxidation prior to the filament winding.

In some embodiments, the methods provided herein include functionalizing the two or more carbon nanotube yarns by chemical functionalization prior to the filament winding.

In some embodiments, the methods provided herein include annealing the two or more carbon nanotube yarns; and contacting the two or more carbon nanotube yarns with an acid prior to the filament winding.

In some embodiments, the methods provided herein can produce composite materials for which mechanical characterization based on American Society for Testing and Materials (ASTM) standards can be conducted on a sizable panel of the composite material. The mechanical tests may include tensile and three-point bend tests, which may permit a comparison with SOTA fiber-reinforced composites.

Composite Materials

Composite materials also are provided herein. In some embodiments, the composite materials include at least one material layer, the material layer including two or more substantially aligned carbon nanotube yarns; and a cured resin, wherein the cured resin at least partially penetrates the two or more substantially aligned carbon nanotube yarns; wherein the two or more substantially aligned carbon nanotube yarns are present in the composite material at an amount of about 50% to about 75% by weight of the composite material.

Figure 8:
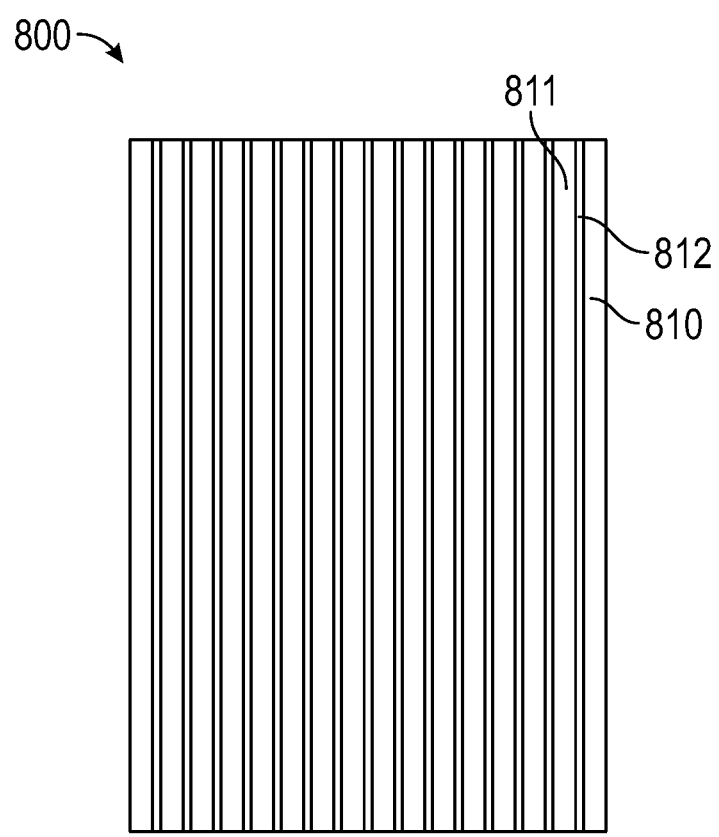
FIG. 8 depicts an embodiment of a composite material.

An embodiment of a composite material is depicted at FIG. 8. The composite material 800 of FIG. 8 includes CNT yarns (810, 811) and a resin 812. At least a portion of the resin 812 is disposed between the CNT yarns (810, 811) of the composite material 800.

In some embodiments, the density of the composite material is about 1.6 g/cm$^3$ to about 1.8 g/cm$^3$. In some embodiments, the density of the composite material is about 1.6 g/cm$^3$ to about 1.7 g/cm$^3$. In some embodiments, the density of the composite material is about 1.7 g/cm$^3$ to about 1.8 g/cm$^3$.

In some embodiments, the tensile strength of the composite material is about 1.8 GPa to about 2 GPa. In some embodiments, the tensile strength of the composite material is about 1.9 GPa to about 2 GPa.

In some embodiments, the tensile modulus of the composite material is about 340 GPa to about 360 GPa. In some embodiments, the tensile modulus of the composite material is about 340 GPa to about 350 GPa.

In some embodiments, the tensile failure strain of the composite material is about 1.0% to about 1.4%. In some embodiments, the tensile failure strain of the composite material is about 1.2% to about 1.4%.

In some embodiments, the flexural strength of the composite material is about 0.85 GPa to about 0.99 GPa. In some embodiments, the flexural strength of the composite material is about 0.90 GPa to about 0.99 GPa.

In some embodiments, the flexural modulus of the composite material is about 150 GPa to about 170 GPa. In some embodiments, the flexural modulus of the composite material is about 160 GPa to about 170 GPa.

In some embodiments, the flexural failure strain of the composite material is about 4% to about 6%. In some embodiments, the flexural failure strain of the composite material is about 5% to about 6%.

In some embodiments, the short beam shear strength of the composite material is about 90 MPa to about 100 MPa. In some embodiments, the short beam shear strength of the composite material is about 95 MPa to about 100 MPa.

In some embodiments, the compressive modulus of the composite material is about 95 GPa to about 115 GPa. In some embodiments, the compressive modulus of the composite material is about 105 GPa to about 115 GPa.

In some embodiments, the axial electrical conductivity (S/cm) of the composite material is about 700 S/cm to about 715 S/cm. In some embodiments, the axial electrical conductivity (S/cm) of the composite material is about 710 S/cm to about 715 S/cm.

In some embodiments, the transverse electrical conductivity of the composite material is about 30 S/cm to about 50 S/cm. In some embodiments, the transverse electrical conductivity of the composite material is about 40 S/cm to about 50 S/cm.

In some embodiments, the out-of-plane conductivity of the composite material is about 25 S/cm to about 40 S/cm. In some embodiments, the out-of-plane conductivity of the composite material is about 35 S/cm to about 40 S/cm.

In some embodiments, the composite material comprises a weight percentage of the two or more carbon nanotube yarns of about 50% to about 75%, by weight. In some embodiments, the composite material comprises a weight percentage of the two or more carbon nanotube yarns of about 55% to about 75%, by weight. In some embodiments, the composite material comprises a weight percentage of the two or more carbon nanotube yarns of about 60% to about 75%, by weight. In some embodiments, the composite material comprises a weight percentage of the two or more carbon nanotube yarns of about 65% to about 75%, by weight. In some embodiments, the composite material comprises a weight percentage of the two or more carbon nanotube yarns of about 70% to about 75%, by weight.

In some embodiments, the composite material exhibits any combination of the foregoing properties. For example, the composite material may have (i) a density of about 1.60 g/cm$^3$ to about 1.8 g/cm$^3$, (ii) a tensile strength of about 1.8 GPa to about 2 GPa, (iii) a tensile modulus of about 340 GPa to about 360 GPa, (iv) a tensile failure strain of about 1.0% to about 1.4%, (v) a flexural strength of about 0.85 GPa to about 0.99 GPa, (vi) a flexural modulus of about 150 GPa to about 170 GPa, (vii) a flexural failure strain of about 4% to about 6%, (viii) a short beam shear strength of about 90 MPa to about 100 MPa, (ix) a compressive modulus of about 95 GPa to about 115 GPa, or (x) a combination thereof.

In the descriptions provided herein, the terms "includes," "is," "containing," "having," and "comprises" are used in an open-ended fashion, and thus should be interpreted to mean "including, but not limited to." When methods or compositions are claimed or described in terms of "comprising" or "including" various elements or features, the methods can also "consist essentially of" or "consist of" the various components or features, unless stated otherwise.

The terms "a," "an," and "the" are intended to include plural alternatives, e.g., at least one. For instance, the disclosure of "a CNT yarn," "a resin," "a liquid", and the like, is meant to encompass one, or mixtures or combinations of more than one CNT yarn, resin, liquid, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, numerical end points of ranges disclosed herein are approximate. As a representative example, Applicant discloses that, in some embodiments, the composite material includes a weight percentage of the two or more carbon nanotube yarns of about 65% to about 75%, by weight. This disclosure should be interpreted as encompassing values of about 65% and about 75%, by weight, and further encompasses "about" each of 66%, 67%, 68%, 69%, 70%, 71%, 72%, 73%, and 74%, including any ranges and sub-ranges between any of these values.

The present embodiments are illustrated herein by referring to various embodiments, which are not to be construed in any way as imposing limitations upon the scope thereof. On the contrary, it is to be understood that resort may be had to various other aspects, embodiments, modifications, and equivalents thereof which, after reading the description herein, may suggest themselves to one of ordinary skill in the art without departing from the spirit of the present embodiments or the scope of the appended claims. Thus, other aspects of the embodiments will be apparent to those skilled in the art from consideration of the specification and practice of the embodiments disclosed herein.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Preparation of Composite Materials

In this example, CYTEC® 5250-4 BMI resin and an autoclave process were used. Tensile testing and three-point bending tests were conducted on the composite materials herein, as well as SEM failure analysis. The method of this example permitted the design and fabrication of scalable (4"×4"×0.1" panel size) and aerospace-quality advanced composite materials using commercially available CNT yarns.

This was accomplished through the use of a heat assisted multiple step stretching technique (HAMSS), semi-automated filament winding of unspun CNT yarn, and a curing under tension process.

An embodiment of a composite material was formed in this example. The composite material of this example was formed with the system depicted at FIG. 1A-FIG. 1C.

FIG. 1A depicts the embodiment of the system 100 used in this example, which included three spools (111, 112, 113) of CNT yarns (101, 102, 103), which, while under tension, were filament wrapped with a stretching tool 120 to form material layer 121, which, in this example, included 10 layers of CNT yarns. The system 100 of FIG. 1A also included an apparatus 130 for contacting the CNT yarns (101, 102, 103) and a material layer 121 with a resin 133. The apparatus 130 included a nozzle 132 in fluid communication with a reservoir 131 that, in this example, stored a mixture of the resin and acetone.

The unspun CNT yarns of this example were filament wound around a 9" long stretching tool 120 to a sample width of 4.5" on a semi-automatic winder. The filament winding in this example was completed over a 9"×4.5" area of the stretching tool 120. A total of 10 layers of CNT yarns were wrapped around the stretching tool 120 to form the material layer 121. During the winding process of this example, the layers of the material layer 121 were impregnated with CYCOM® 5250-4 bismaleimide resin (SOLVAY®, USA) in acetone.

The samples were then placed on a MTS 858, and were held at 70° C. to allow the BMI resin to reach a less viscous state. The lowered viscosity of the resin acted as a lubricant to decrease the friction between the fibers and assist in the stretching process.

As explained below, the sample was stretched using a heat assisted multiple step stretching process (HAMSS) in increments of 2-3% extension for each step. After the 2-3% extension, there was a 10 minute holding period at which the extension was held constant, followed by another 2 minute stress relaxation period where the force was brought to zero before the sample was extended again.

This process was repeated for 10 cycles in total resulting in approximately 15% total extension, which was in addition to the 30% stretch ratio from the pre-stretched alignment.

Figure 1B:
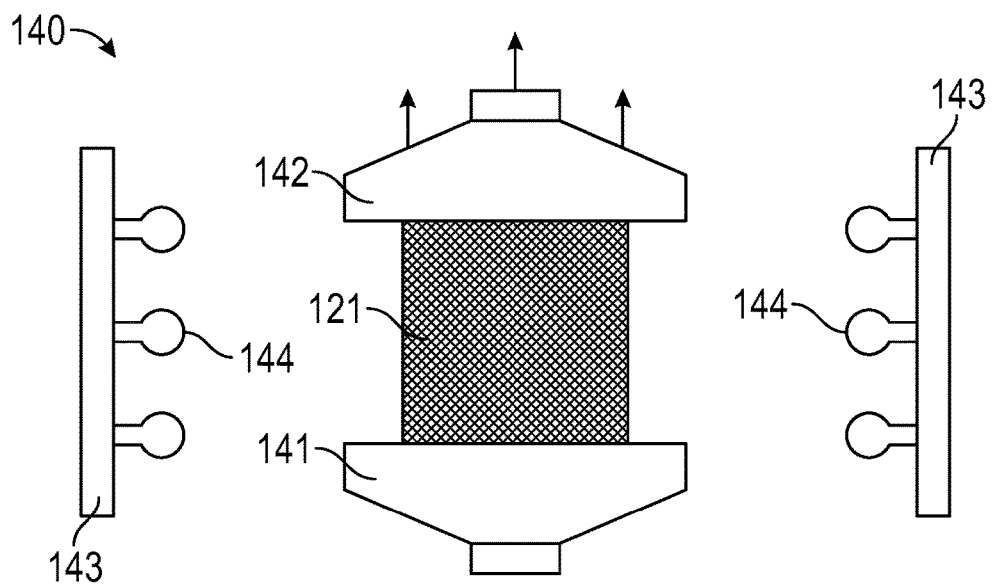
FIG. 1B depicts an embodiment of an apparatus for subjecting an embodiment of a material layer to heat and stretching.

FIG. 1B depicts the embodiment of the stretching apparatus 140 that was used in this example. The material layer 121 of FIG. 1A was removed from the stretching tool 120, and secured between a fixed clamp 141 and a movable clamp 142. The movable clamp 142 was moved in the direction of the arrows depicted at FIG. 1B to apply a stretching force to the material layer 121. The material layer 121 was flanked by heating apparatuses 143 that included heating bulbs 144. Although, for convenience, the heating bulbs 144 of FIG. 1B are depicted as aligning with the edges of the material layer 121, which may be the configuration of some embodiments, the heating bulbs 144 were directed towards the opposite surfaces of the material layer 121 in this example.

While exposed to a temperature of about 70° C., the material layer 121 and 9 other material layers of this example was subjected two stretching forces: at a 2% extension for the first 5 forces, and a 3% stretch for the last 5 forces. This permitted plastic, irreversible deformation to be reached in each cycle for the material layer 121 of this example, which allowed for adequate alignment of the material layer 121 of this example. About 15% additional strain was reached using the heat assisted multiple step stretching technique of this example, which likely resulted in about 40% to about 50% total strain for the material layer of this example. In this example, continuous monitoring of the temperature was completed during stretching to ensure the material layer 121 remained at about 70° C.

Figure 1C:
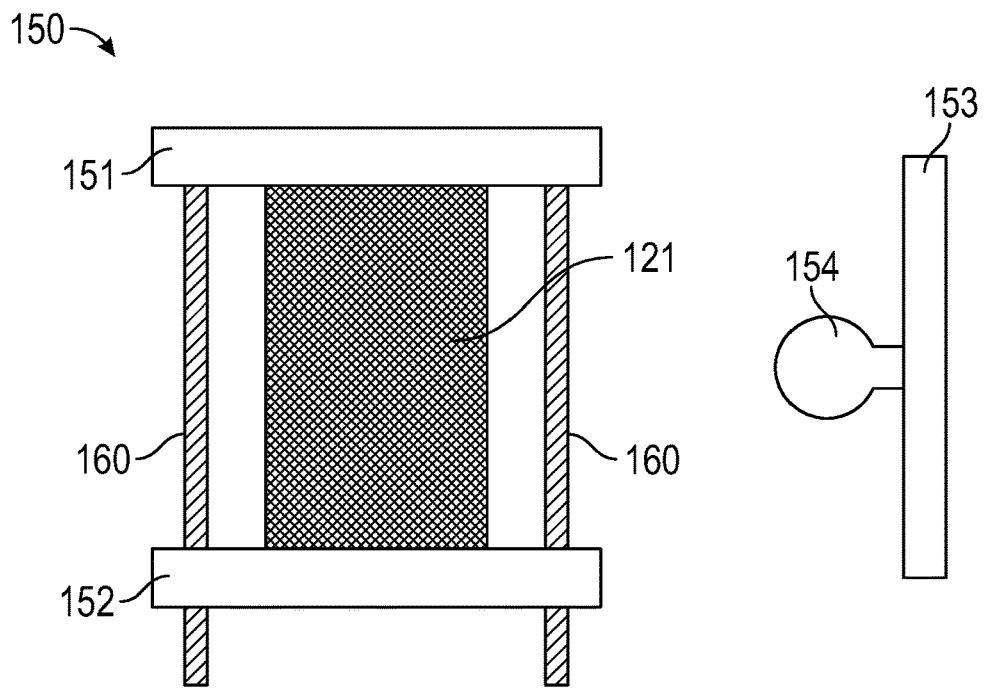
FIG. 1C depicts an embodiment of an apparatus for curing and heating an embodiment of a material layer.

After the stretching forces of this example were applied, the material layer 121 was cured while under tension. The apparatus 150 used in this example to cure the material 121 while under tension is depicted at FIG. 1C. The material layer 121 was secured by a first clamp 151 and a second clamp 152, which were separated by two threaded rods 160. The threaded rods 160 were twisted to apply a stretching force to the material layer 121, while the material layer 121 was heated with a heating apparatus 153 that included a heating lamp 154. Although a single heating lamp 154 was used in the curing of this example, the heating apparatus 143 of FIG. 1B or a different heating apparatus could be used.

Specifically, autoclave curing of the composite material of this example was achieved using a "curing-under-tension (CUT)" technique. The stretched CNT pre-preg was clamped on both ends of a CUT tool (FIG. 1C), and tension was applied by turning the screws (160) on both sides of the tool. Even tension was ensured by measuring the distance between the screws on each side. Tension was then locked by tightening the screws and applied during the entire curing process. CUT initiated the stress-induced curing process that allowed CNTs and polymer molecules to orient along the stress direction. The CUT process could have further stretched the sample, which could have increased the alignment of the CNT yarn thereby increasing the CNT composite properties.

Figure 1D:
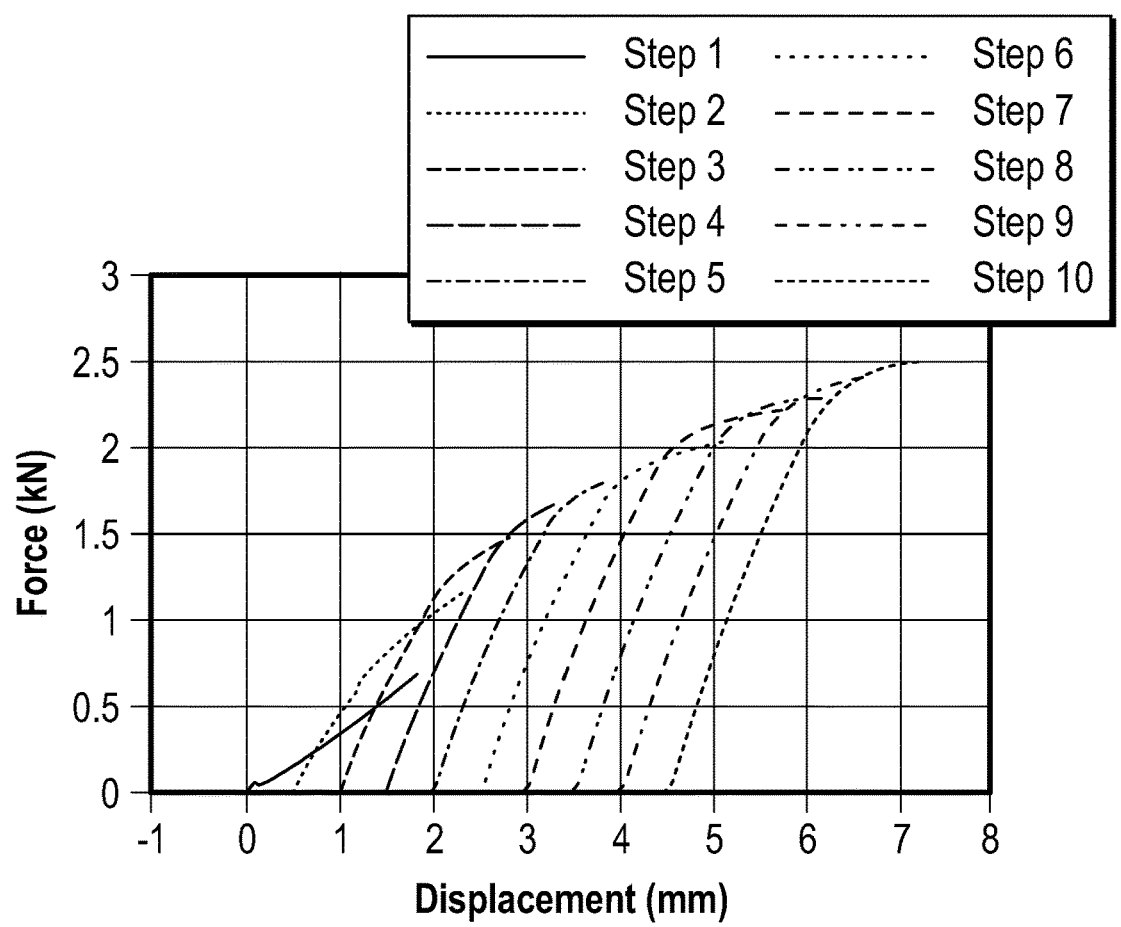
FIG. 1D depicts an in situ recording of force-displacement curves during an embodiment of a stretching process (a 0.5 mm gap is displayed between each phase).

FIG. 1D shows a typical force-displacement graph of a sample stretched to a 2% strain for the first 5 steps and 3% strain for the last 5 steps. At 2-3% of strain, the CNT pre-preg was seen to exhibit plastic, irreversible deformation in each step of the stretching process. The cyclic small step stretching process resulted in a strain-hardening effect on the CNT pre-preg. Higher CNT alignment and packing was achieved, thus potentially higher strength and modulus of the sample The sample was then soaked in acetone to remove the resin before functionalization in m-CPBA acid solution. After functionalization, the sample was re-impregnated with BMI resin to achieve 60 wt. % CNT. The stretched layers were cut to size and stacked together before being cured under tension with both heat and pressure applied to the sample. The resulting panel was 4"×4"×0.1".

Example 2—Purification and Functionalization

In this example, embodiments of purification and functionalization methods were performed on spun (diameter of about 0.16 mm) and unspun (width of about 1 mm) CNT yarns. The CNT yarns of this example were obtained from NANOCOMP® Inc. FIGS. 1 and 2 are schematics of the methods of this example. A number of analyses, including thermogravimetric analysis (TGA, TA instrument TGA Q50) and tensile tests (TA instrument DMA Q800 and ASG-J Shimadzu) were performed on the resulting samples to determine the effects of the surface treatments.

Heat Treatment and Acid Wash:

In a first test, CNT yarns were purified by heat treatment and acid wash.

In this example, a surface treatment of spun CNT yarn was performed in an attempt to remove catalyst, densify the material, and/or prepare it for resin impregnation.

The spun CNT yarns of this example were first annealed at 400° C. for 2 hours. Following the annealing, the spun CNT yarns were immersed in an HCl solution (18 wt. %). The spun CNT yarns were then removed from the HCl solution, and rinsed with DI water.

Thermogravimetric analysis (TGA) and Raman spectroscopy were used to confirm the removal of chemicals from the surfaces of the CNT yarns.

Figure 2A:
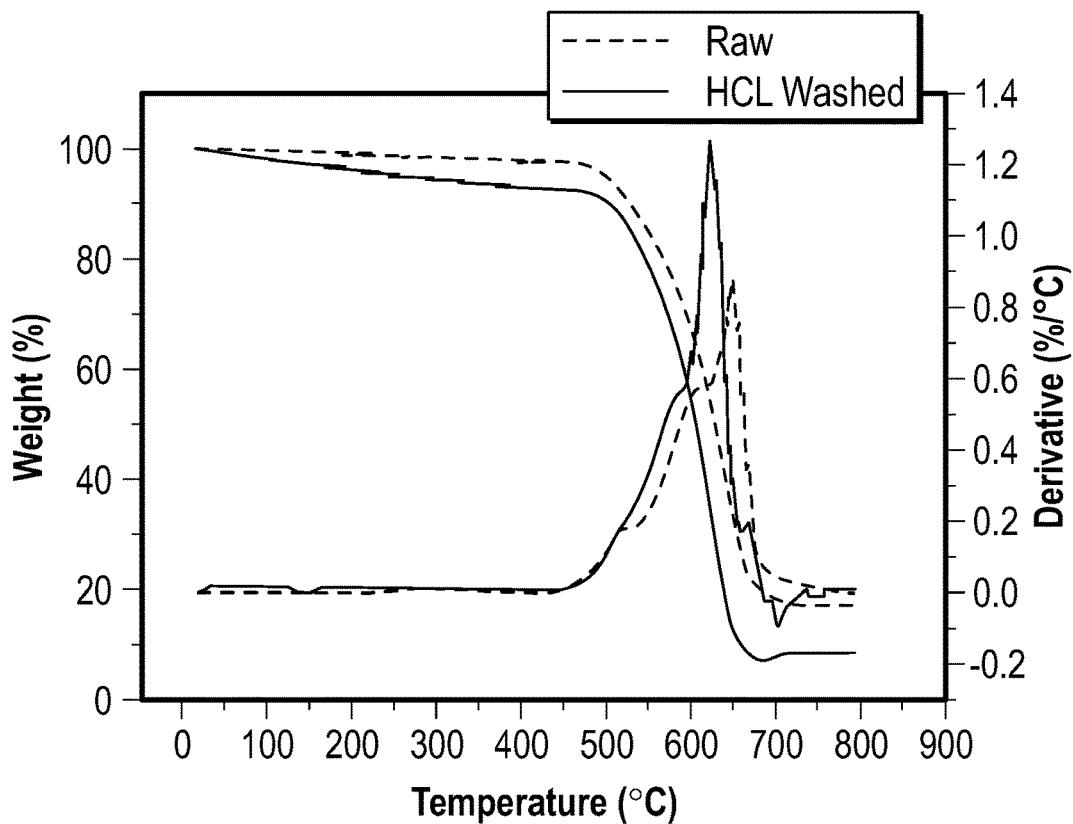
FIG. 2A depicts a thermogravimetric analysis of an embodiment of a CNT yarn before and after an embodiment of a surface treatment process.

It was found that after three cycles of surface treatment, catalyst content was reduced from 20 wt. % to less than 8 wt. %, as depicted at FIG. 2A. The stable mass of the CNT yarn sample in TGA measurement indicated a low mass fraction of binders and other materials.

Figure 2B:
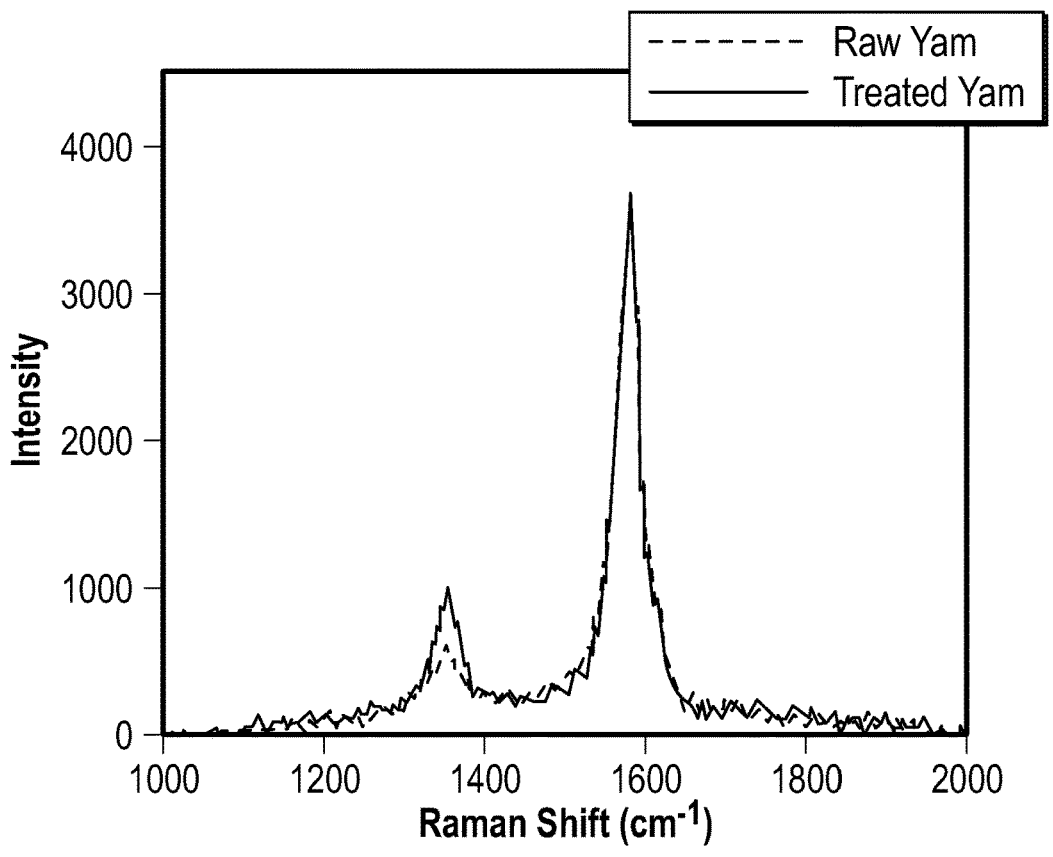
FIG. 2B depicts Raman spectroscopy data for an embodiment of a CNT yarn before and after an embodiment of a surface treatment process.
Figure 3B:
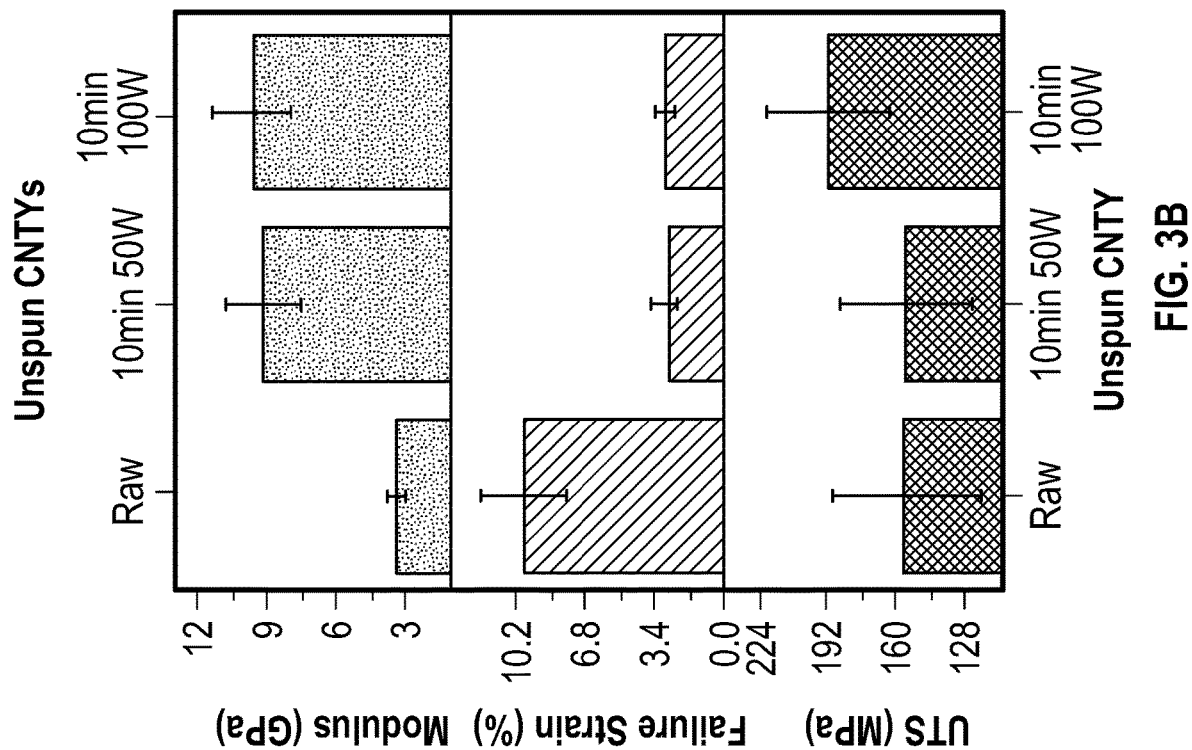
FIG. 3B depicts data regarding the strength, modulus, and failure strain of embodiments of unspun CNT yarns.
Figure 3A:
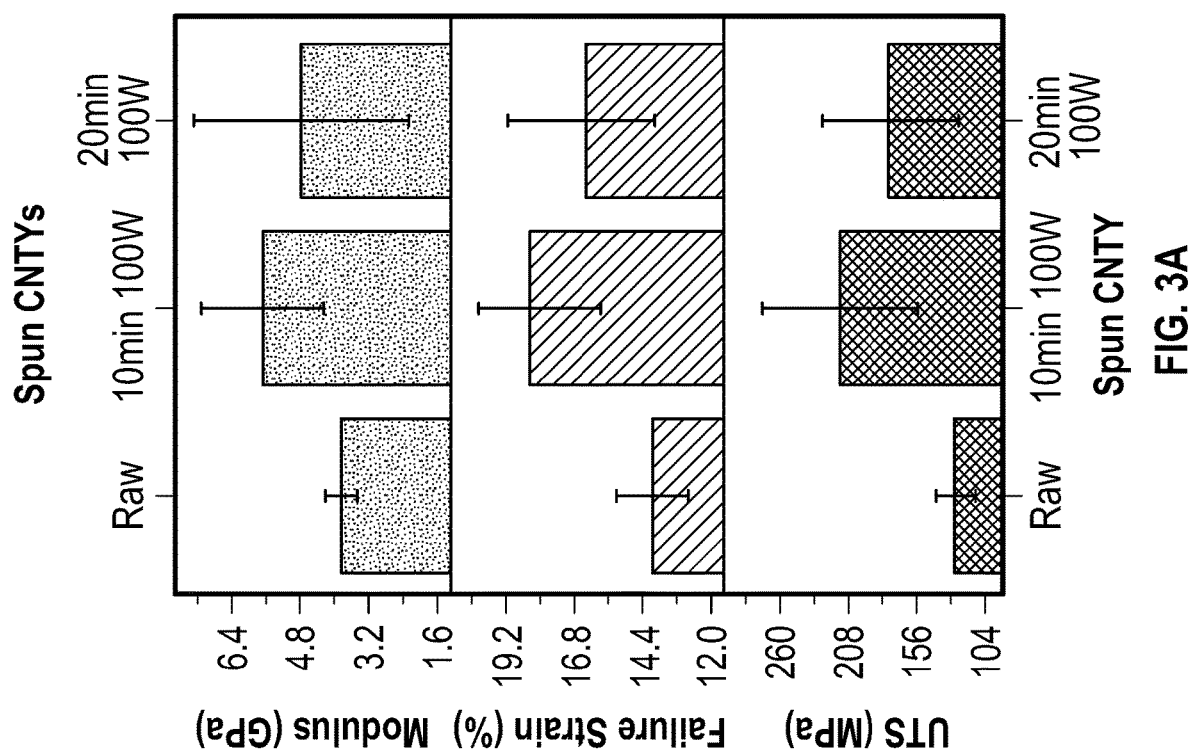
FIG. 3A depicts data regarding the strength, modulus, and failure strain of embodiments of spun CNT yarns.

Raman spectroscopy measurements were performed to allow insight into the chemical structure of the CNT yarns after the surface treatment of this example. As depicted at FIG. 2B, the D band, occurring at approximately 1350 cm$^{-1}$, was a reaction of sp3 carbon-carbon bonds. The increase in the D band indicated more sp3 bonding of CNTs on the surface of the yarn after treatment.

This could be attributed to the removal of foreign particles from the surfaces of the nanotubes, which simultaneously could have created more functional groups on the CNT surfaces. This could enhance interfacial bonding.

Transmission electron microscopy (TEM) images collected before and after the surface treatment of this example also indicated a significant change in the surface structure of the individual nanotubes. The treated CNT yarns appeared to have a more regular surface, with an apparent surface coating.

This different may have resulted from the removal of epoxides, amorphous carbon, and/or organic molecules from the raw CNT yarn. The surfaces were more regular, though highly variegated, which indicated surfaces possibly substituted by functional groups. In contrast, the raw, untreated CNT yarns of this example exhibited irregular surfaces, with amorphous carbon and other organic chemicals adhered to the surface of the nanotubes.

Plasma Treatment:

Plasma oxidation was also explored in this example, due, at least in part, to the potential for scalability that it can provide. A plasma system FEMTO® model by Diener Electronic Inc. was used. The effects of two major parameters, time and power, were investigated. Oxygen was used at a 100 sccm (standard cubic centimeters per minute) flow rate during plasma treatment.

The spun yarn received plasma oxidation at 100 Watts and the time was varied from 10 minutes to 20 minutes.

The unspun yarn received plasma oxidation for 10 minutes, and the power was varied at 50 and 100 Watts.

Scanning Electron Microscopy (SEM) was used to collect images, which revealed a morphology evolution at different plasma treatment conditions. For spun yarns, sample surfaces received adequate etching when plasma was applied for 10 minutes at 100 Watts power. When the treatment time was extended to 20 minutes, the sample surface was likely over treated, leading to CNT damage in this example.

For unspun yarn, based on the relatively smooth surfaces observed in the SEM images, the sample surface did not appear to have enough etching when plasma was applied for 10 minutes at 50 W. Thus, a higher power or longer treatment time was preferred for this example.

The mechanical properties of the plasma treated single filament spun and unspun CNTYs were compared. Sample dimensions of the CNT yarns were measured by SEM.

For spun yarns, the plasma treatment significantly enhanced yarn strength, modulus, and failure strain, which confirmed the effectiveness of plasma treatment of this example. Some plasma treatments may improve one or more of these properties. Spun yarns treated for 20 minutes showed a decrease in strength, modulus, and failure strain, compared to those treated for 10 minutes, which indicated that there was a possibility of over-treatment. For unspun CNT yarns, the plasma treatment significantly reduced failure strain, resulting in drastically increased modulus. Plasma treatment at 50 W for 10 minutes was not effective due to the unchanged strength. It was also evidenced by the smooth surface that was observed. While applying doubled power at 100 W for 10 min, unspun CNT yarn strength was significantly enhanced.

Acid Functionalization of CNT Yarns (CNTY):

Table 1 below compares the mechanical properties of raw and surface treated yarns.

The raw CNTY/BMI composite had a strength of 1.75 GPa and modulus of 91 GPa, whereas IM7/BMI composite has a tensile strength of 2.6 GPa and a Young's modulus of 162 GPa. Functionalization was also a solution to further improve the composite modulus.

However, compared to the failure strain of 1.5% of IM7/BMI composites, the failure strain of CNTY/BMI composites was as high as 4.5%, which greatly enhanced the resulting composite's toughness. Due to the ease of implementation into the manufacturing process, and the increased properties, acid functionalization for at least 1 hour was used in conjunction with mechanical stretching to manufacture a large-scale sample.

Due to a more consistent width of the unspun CNT yarns, the unspun CNT yarn of about 1 mm in width was chosen to manufacture the large CNT composite samples of the examples herein. However, a sample of spun yarn was manufactured for tensile testing.

TABLE 1

Effects of chemical functionalization on the mechanical properties of CNTY/BMI composites based on single filament tests.

| Yarn Type | Functionalization Time (min) | UTS (MPa) | Failure_Strain (%) | E (GPa) |
|---|---|---|---|---|
| Spun | Raw | 1747 ± 24 | 3.4 ± 1.5 | 91 ± 12 |
| | 10 | 1278 ± 90 | 2.8 ± 0.8 | 79 ± 6 |
| | 30 | 1482 ± 180 | 1.9 ± 0.2 | 98 ± 7 |
| | 60 | 1511 ± 52 | 1.6 ± 0.1 | 112 ± 5 |
| Unspun | Raw | 1400 ± 57 | 3.1 ± 0.4 | 60 ± 2 |
| | 10 | 1390 ± 172 | 2.7 ± 0.3 | 87 ± 13 |
| | 30 | 680 ± 227 | 2.0 ± 0.2 | 73 ± 14 |
| | 60 | 383 ± 87 | 1.1 ± 0.6 | 35 ± 8 |

TABLE 2

Mechanical testing sample parameters of CNT yarn

| Mechanical Test | Material | CNT wt. % | CNT vol. % | Functionalization | Final Stretch Ratio (%) |
|---|---|---|---|---|---|
| Tensile | Spun yarn | 60 | 47.5 | No | ~50 |
| | | | | Yes | |
| | Unspun yarn | 70 | 58.1 | No | ~43 |
| | | | | Yes | |
| Three point bend | Unspun yarn | 70 | 58.1 | Yes | ~43 |

The unspun CNT yarn of this example (and which was used to make the composite material of claim 1) was a filament wound around a 9" long stretching tool to a sample width of 4.5" on a semi-automatic winder. A plot of force vs. displacement from completion of the stretching process is depicted at FIG. 1D.

Tensile and flexural testing were performed in accordance to ASTM standards on an ASG-J testing apparatus (Shimadzu, USA). Tensile modulus was measured using dynamic mechanical analysis under film deformation mode.

Scanning electron microscopy (SEM), JEOL F7401 field emission microscope, and transmission electron microscopy (TEM), JEM-ARM200cF, were also completed on the sample to characterize the surface quality and failure modes of the CNT samples.

Tensile Testing of the Composite Material of Example 1 (ASTM D3039 AND D7028): Table 3 summarizes the tensile test results from the CNT composite samples of Example 1 compared to unidirectional (UD) IM7/5250-4 BMI composite (see, e.g., "Cytec Engineered Materials, CYCOM® 5250-4 pre-preg system Technical data sheet," 2014). The ultimate tensile strength (UTS) and failure strains were found during testing according to the ASTM D3039, modulus was found through dynamic mechanical analysis (DMA) testing using ASTM D7028.

Testing results indicated that maximum UTS and modulus of about 1900 MPa and 351 GPA respectively, could be achieved through use of spun CNT yarn and acid functionalization.

The next highest properties could be achieved with unspun CNT yarn also with acid functionalization. These results proved that the HAMSS process helped the CNT composite achieve higher CNT alignment and better packing, therefore, significantly improved the composite tensile properties. Additionally, the acid functionalization process increased the tensile properties with both the spun and unspun CNT yarn.

TABLE 3

Summary of sample parameters and their tensile properties

| Material | Functionalization | UTS*(MPa) | Modulus*(GPa) | Failure Strain (%) |
|---|---|---|---|---|
| Spun yarn | No | 1315 ± 65 | 192 | 2.1 ± 0.17 |
| | Yes | 1901 ± 37 | 351 | 1.5 ± 0.20 |
| Unspun yarn | No | 1112 ± 83 | 145 | 1.8 ± 0.31 |
| | Yes | 1346 ± 76 | 226 | 1.3 ± 0.11 |
| UD IM7/ 5250-4 BMI* | — | 2600 | 162 | 1.6 |

*Results have been normalized to 60 vol. % CNT

Figure 4:
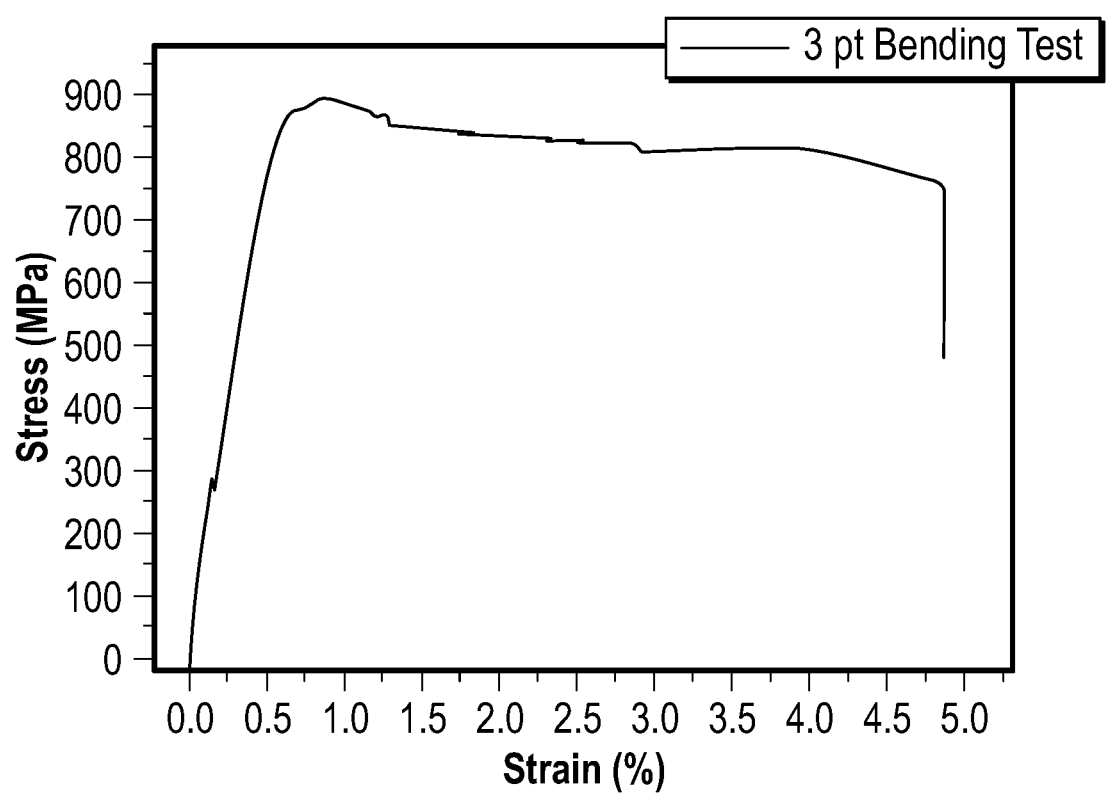
FIG. 4 depicts a stress-strain curve collected by an embodiment of a 3-point bending test for an embodiment of a composite material having the following dimensions: 50 mm length, 8 mm width, and 0.47 mm thickness.

Three Point Bend Testing of the CNT Composite (ASTM D790):

Three-point bending tests were conducted on CNT/BMI composites of aligned and high concentration CNTs. The CNT material used was unspun yarn with acid functionalization. A stress-strain curve is depicted at FIG. 4.

Flexural strength was 930 MPa, flexural modulus of 159 GPa and 5.1% flexural strain (normalized to 60 vol. % CNT). The UD IM7/5250-4 BMI composites had 1.7 GPa flexural strength, 157 GPa flexural modulus, and 2.3% flexural strain (normalized to 60 vol. % carbon fiber). The failure strain of the CNT composite was more than twice as much as an IM7 composite.

Failure Mode Analysis of Tensile Testing:

SEM images were collected of the failed specimen tips after tensile tests. Two completely different failure modes were observed for spun and unspun CNTYs.

For spun yarn composites, explosive failure was observed. It was very similar to the failure of UD IMT/BMI composites. It was observed that the CNTY separation and delamination between the CNT yarns were the major failure modes. However, CNTs were still pulled out rather than breaking. This indicated that the interface between the CNT and the BMI resin matrix was not strong enough to fully utilize the properties that CNTs were able to exhibit.

Unlike the explosive failure of spun CNTs, unspun yarn had sharp and clear-cut fracture ends, according to the SEM images that were collected.

The SEM images showed very slight delamination of the unspun yarn composites, indicating good load transfer between the CNTY and the resin matrix. However, it was noted that the CNTs still failed by pulling out rather than breaking. The pulling out of the CNTs in both the spun and unspun yarn was indicative that further improvements could be made to increase the interfacial bonding at the CNT surface to further enhance the mechanical properties of CNT composites.

Using the HAMSS method and acid functionalization in this example, sizeable composite panels were manufactured that were able to be scaled up for sizable sample fabrication for ASTM standard tests. Using the HAMSS method of stretching in conjunction with acid functionalization, the properties of CNT composites were substantially comparable with UD IM7/5250-4 BMI composites.

Table 4 lists the mechanical and electrical properties of the high CNT content composite compared to SOTA IM7/BMI composites. Both tensile and flexural modulus were higher than that of the SOTA IM7 composite. Most notably, the electrical properties of the CNT composite were drastically higher than that of the SOTA IM7 composite in three directions. Further improvement of the CNT composite could be achieved through surface treatment and purification.

TABLE 1

Comparison of mechanical and electrical properties between CNT yarn/BMI composite and SOTA UD IM7/5250-4 BMI composite

| Properties | CNT/BMI* | UD IM7/5250-4 BMI** |
|---|---|---|
| Density (g/cm$^3$) | 1.64-1.74 | 1.57 |
| Tensile strength (GPa) | 1.90* | 2.62* (2.60) |
| Tensile modulus (GPa) | 351* | 159* (162) |
| Tensile failure strain (%) | 1.2 | 1.6 |
| Flexural strength (GPa) | 0.93* | 1.76* (1.70) |
| Flexural modulus (GPa) | 159* | 157* (157) |
| Flexural failure strain (%) | 5.1 | 2.3 |
| Short beam shear strength (MPa) | 98 | 108 (139) |
| Compressive modulus (GPa) | 106* | 140* (158) |
| Axial electrical conductivity (S/cm) | 707 | 93 |
| Transverse electrical conductivity (S/cm) | 37 | 0.13 |
| Out-of-plane conductivity (S/cm) | 32 | 0.04 |

*Results are normalized to 60 vol. % of CNT or carbon fiber in the composite samples.
**Results in parentheses are taken from Solvay IM7/5250-4 technical datasheet.

Example 3—Atomic Resolution Imaging and Analysis of Microstructures and Interface of Aligned Carbon Nanotube Composites In this example, cross section samples for interface and internal CNT structural observations were prepared using different degrees of aligned samples and focused ion beam (FIB). The degree of alignment related to the mechanical properties and X-ray scattering data were correlated with the resulting TEM images. Also, electron energy loss spectroscopy (EELS) was performed to understand the interfacial properties and sp2 bonding status after the functionalization.

A high alignment degree of CNT was achieved with mechanical stretching methods and polarized Raman and X-ray scattering results confirmed the degree of alignment up to 0.93 at 80% stretched samples. Tensile properties of aligned CNT sheet/BMI composite was also proportional to the degree of alignment with the highest modulus of 252 GPa and strength over 1.45 GPa achieved. Thin lamellae cross sections of the aligned CNT composite were prepared in FIB, and TEM observations of these cross sections showed more transverse cuts of CNTs with higher stretched samples and dense-packing of flattened DWCNTs bundles. EELS was also performed to check the quality of sp2 bonding and its interface properties after functionalization. A slightly reduced sp2 bonding could be observed in the functionalized samples.

CNT sheets were stretched with the aid of a resin, and its degree of alignment was determined by X-ray scattering and polarized Raman scattering (In-via, Resnishaw) with 785 nm excitation. Both pristine and aligned CNT sheets were functionalized in m-CPBA with dichlormethane, then soaked in diluted bismaleimide (BMI) resin and cured under hot press 177° C. for four hours and post-cured for higher mechanical properties. Tensile properties were measured using a Shimadzu with extensometer.

The resulting CNT composites were mounted for FIB (FEI, Helios 600) sample preparation and thin lamellae were fabricated and mounted onto a Mo grid. Thinned samples were observed under high-resolution transmission electron microscope (HRTEM, JSM ARM-200cF, JEOL). TEM imaging and aberration corrected scanning TEM EELS was performed at 80 kV to avoid sample damage. A Gatan GIF camera was used for spectroscopy acquisition.

Alignment of CNT:

SEM images were collected of pristine and 80% stretched CNT sheet at low magnification. Large scale highly aligned CNT structures were observed. Pores between CNTs were reduced because of the dense packing. During the stretching process, the original width of sheet was narrowed and densified while the resulting aligned CNT sheet thickness was increased. The density of 80% stretched CNTs sheets were increased up to 1.61 g/cm$^3$ from the random one of 0.79 g/cm$^3$ (Downes, R. et al., Adv. Eng. Mater. 17(3): 349-358).

Figure 5A:
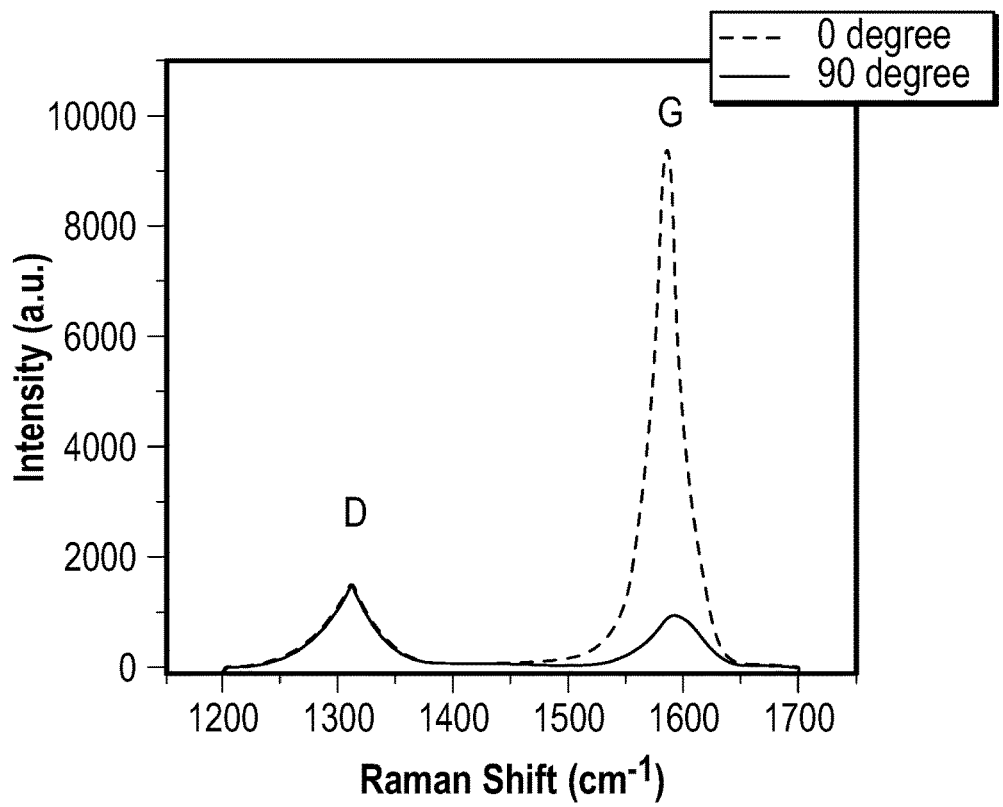
FIG. 5A depicts polarized Raman scattering of D-band and G-band areas of an embodiment of a stretched CNT sheet.

To quantify the degree of alignment of the stretched CNT sheets, polarized Raman spectroscopy and X-ray scattering were used. FIG. 5A is the Raman spectroscopy result of 80% stretched CNT sheet at parallel and perpendicular directions to the laser polarization. Large intensity anisotropy ($I/I\propto 7.8$) was observed between 0 and 90 degrees. The polarized Rama scattering of D-band and G-band areas showed angular dependence; also, areas parallel to the alignment direction showed higher intensity.

Figure 5B:
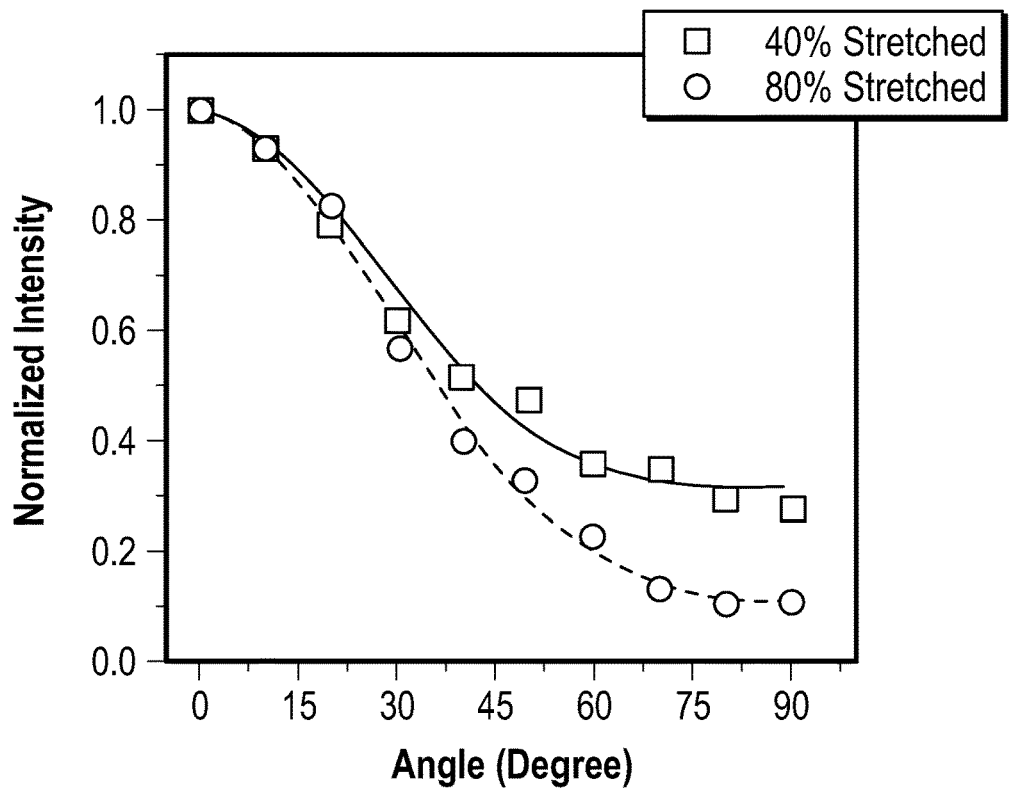
FIG. 5B depicts a plot of normalized intensity for two embodiments of stretched CNT sheets; the plot demonstrates the angular dependence of normalized G-band intensity.

FIG. 5B depicts the angular dependence of the normalized G-band intensities of 40% and 80% stretched samples. Along with the increased stretching ratio, the anisotropy increased and a high degree of alignment of 0.93 was obtained for the 80% stretched sample from the fitting with distribution function.

Figure 5C:
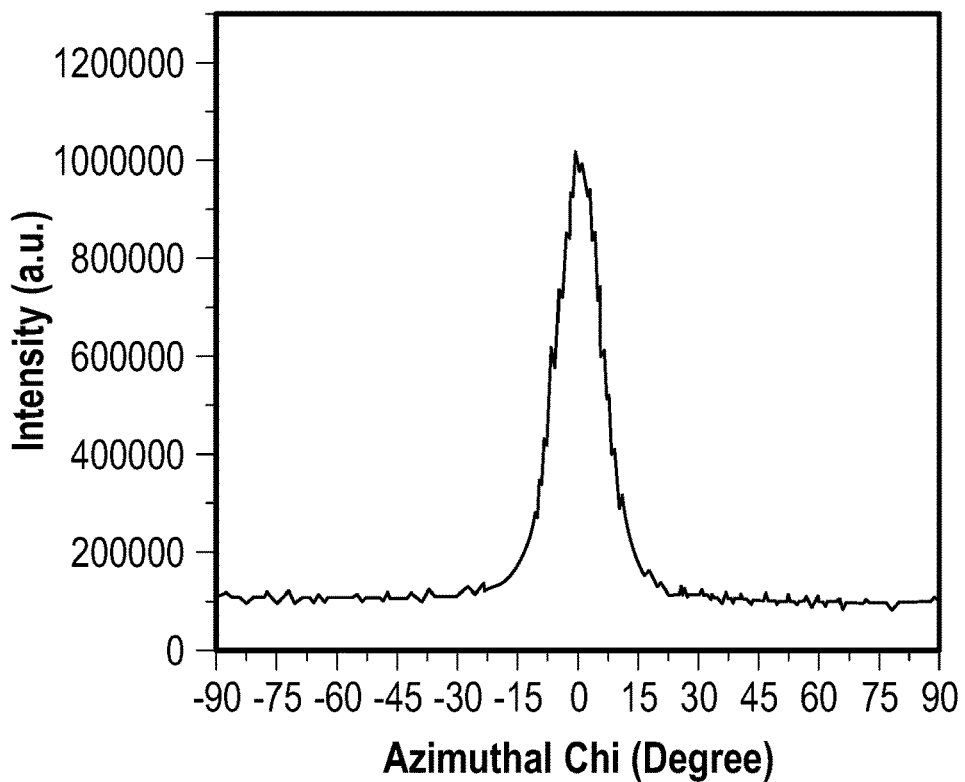
FIG. 5C depicts a plot of intensity versus Azimuthal chi (degree) for an embodiment of a CNT sheet.

Similarly, anisotropic X-ray scattering patterns were also indicative of alignment. WAXS patterns of the random CNT sheet and the 80% CNT sheet were collected. Unlike the circular rings from the randomly dispersed CNTs, 80% stretched CNT sheets showed anisotropy related to the alignment (FIG. 5C). The degree of alignment of 0.92 was obtained from the pattern.

Figure 6:
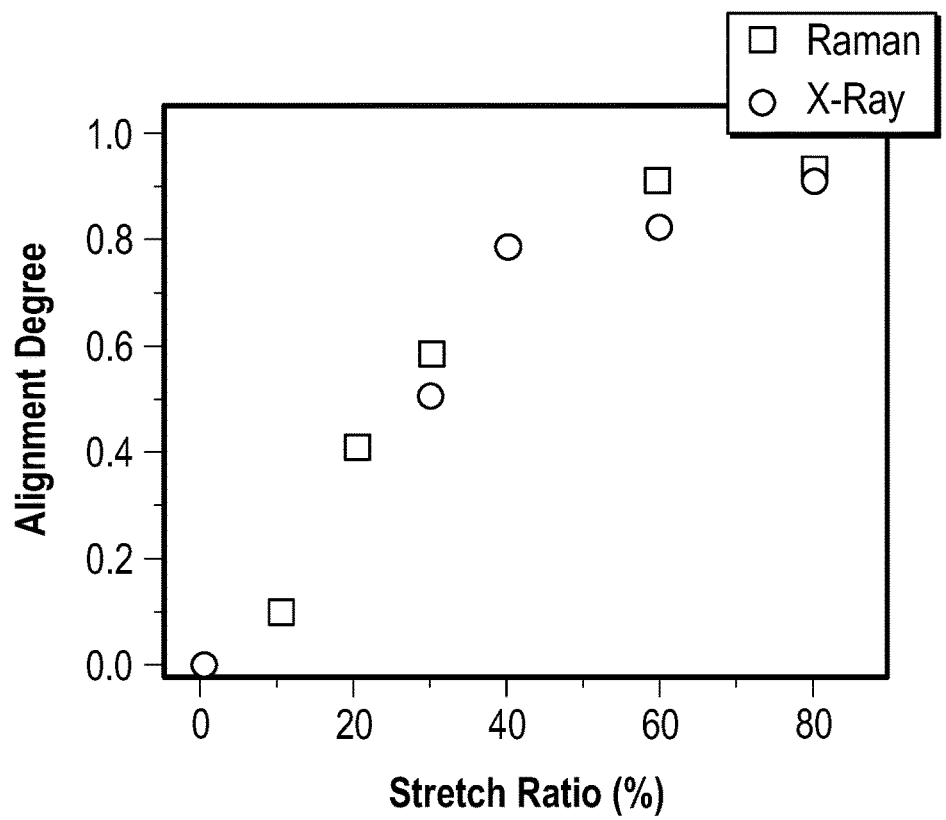
FIG. 6 depicts an estimated alignment degree for an embodiment of a CNT sheet.

FIG. 6 depicts the resulting alignment degree calculated from the Raman and X-ray scattering. Degree of alignment increased sharply around 30% and was saturated over 60% stretch ratio. Both Raman and X-ray scattering showed similar degrees of alignment and trends. The highest degree of alignment of 0.93 was achieved from 80% stretched CNT sheet.

Figure 7A:
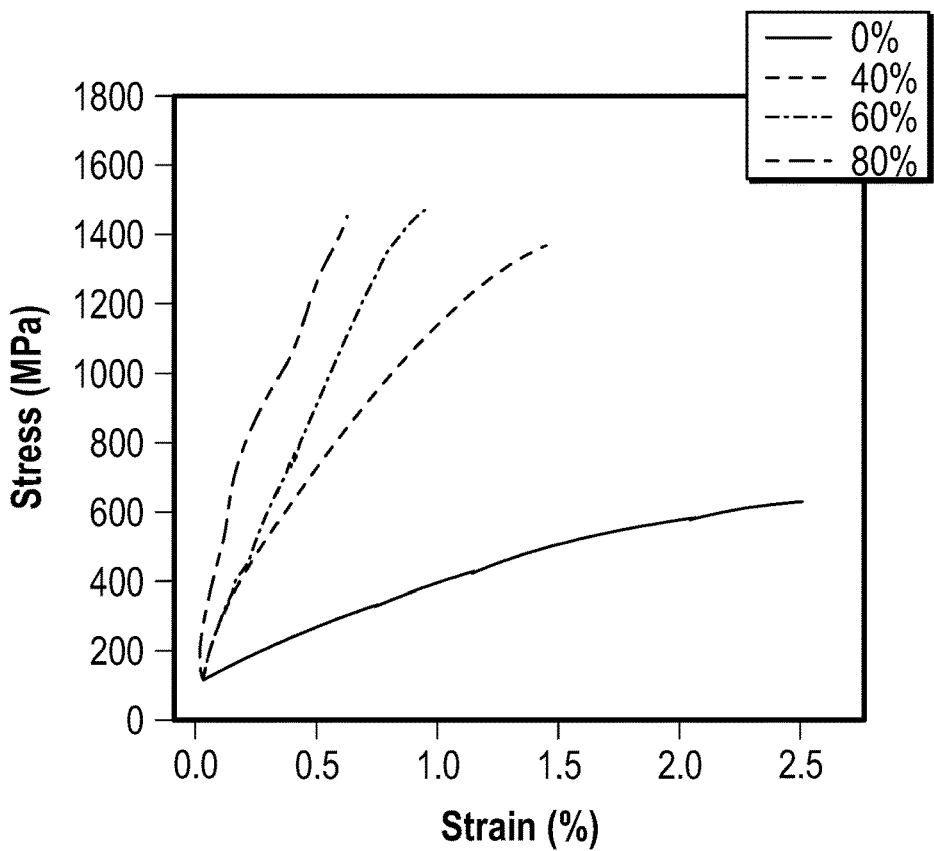
FIG. 7A depicts stress-strain curves of embodiments of composite materials at different stretch ratios.
Figure 7B:
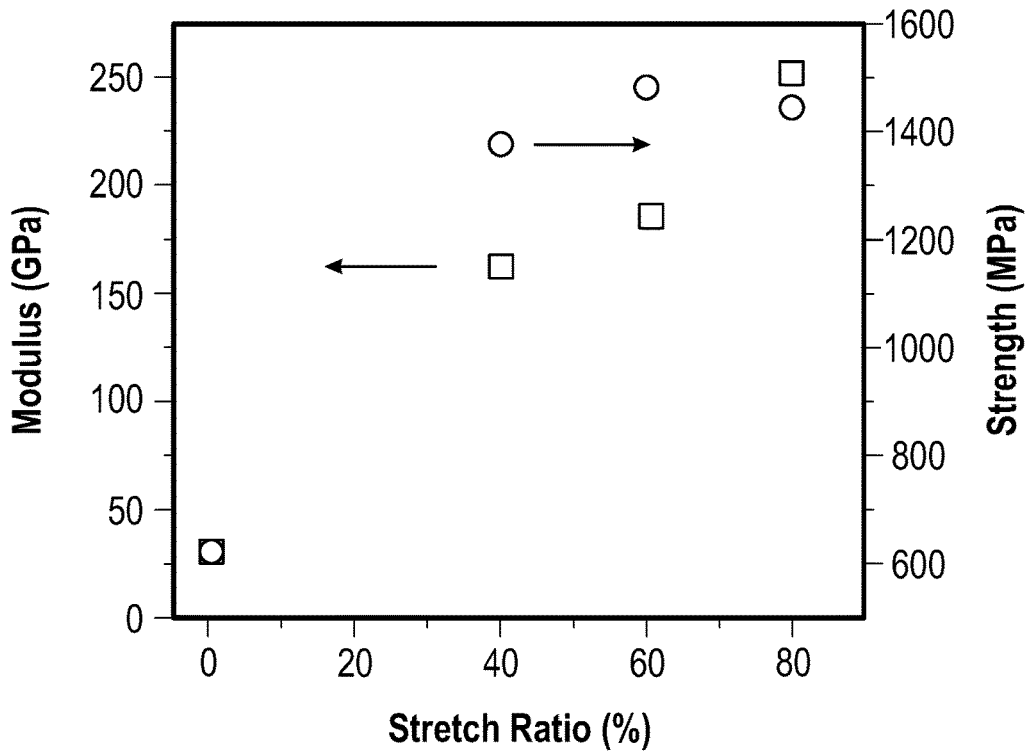
FIG. 7B depicts the tensile modulus and ultimate tensile strength of embodiments of functionalized CNT composite materials as a function of stretch ratio.

Mechanical Properties of Composites:

Stretched CNT sheets were functionalized, and BMI composites were made from these aligned CNT sheets, described at Example 1. FIG. 7A depicts typical tensile stress-strain curves of each composite from different stretching ratios. Both tensile modulus and ultimate tensile strength increased at higher stretching ratios, as shown at FIG. 7B.

With increased CNT alignment in the stretched composite sample, the strain of the composites was reduced from 2.51% in the pristine CNT/BMI composite down to 0.62% at the 80% stretched CNT/BMI composite.

Meanwhile, the modulus increased from 33 GPa to 252 GPa with strength of 1.45 GPa.

As shown at FIG. 6, increments of CNT degree of alignment was reduced and saturated at the higher stretching ratio. From the summarized mechanical properties, modulus increased continuously at the higher stretch ratios; however, strength seemed to be saturated around 1.4 GPa over 40% stretched samples, similar to the degree of alignment.

TEM Observation of the Cross Section:

For TEM observation of the cross section, the composite of each stretched sample was subjected to a focused ion beam technique (FIB). A 2 micron thick Pt protection layer was deposited on the surface perpendicular to the alignment direction. Trenches were fabricated on both sides of the Pt protection layer to make thin lamella, and it was lifted out using OMNIPROBE® nanoanalysis (Oxford Instruments, USA) for grid mounting. After mounting on the grid, the samples were further thinned from 16 kV down to 2 kV for TEM observation. The resulting thickness was less than 30 nm.

Low magnification TEM images were collected of pristine and 35% stretched samples cross sections. Pristine sample of randomly oriented CNTs showed many longitudinal directional cuts in the CNTs, while stretched samples showed more small circular openings related to the CNT cross sections. By increasing the stretch ratio to better align the CNTs, the longitudinal CNT cutting was reduced and more transverse cutting of CNT was observed and dominant. Dense packing of CNT structures confirmed the higher density over 1.4 g/cm$^3$ in the stretched samples (>35%), compared to a random one having 0.76 g/cm$^3$.

High magnification TEM images were collected of randomly oriented and the 35% stretched sample. In the case of randomly oriented CNT composites, the CNT bundles with longitudinal cutting with residual catalyst were seen with small amounts of CNT transverse cutting. Meanwhile, as alignment was increased, more CNT cross sections and densely packed CNTs structures were observed. Most of the double-walled CNTs were flattened and densely packed, while smaller diameter nanotubes (d<5 nm) retained their shape. The high magnification cross section images showed a different status of the collapsed CNT and stacking in the bundle.

EELS measurement on the composite: Carbon K-edge scanning tunneling electron microscopy-electron energy loss spectroscopy (STEM EELS) mapping on the densely packed CNT area was performed. Spectrum imaging was performed over 8.56 nm×4.43 nm with 0.15 nm pixel size, and an energy dispersion of 0.4 eV/channel was used for acquisition. Extracted spectrum from red and blue dot areas, respectively, showed 1s-$\pi^*$ and 1s-$\sigma^*$ transitions at 285 eV and 292 eV, respectively.

However, edge of CNT packing exhibited slightly lower intensity.

Non-linear least square (NLLS) fitting was performed for each transition, and Gaussian fitting of each peak was mapped over entire spectra.

An amplitude map of $\pi^*$ transition and bright area as high intensity coincided with CNT graphitic packing. In the case of sp3 bonding, such as diamond, there was no $\pi^*$ peak, and a decrease of sp2 bonding was recognized from the decreased peak intensity ratio.

A $\pi^*/\sigma^*$ratio map was produced, and slightly decreased $\pi^*$ was observed at the edge of CNT packing. CNT and graphite had anisotropy depending on the orientation of graphitic plan.

Based on the studies on several different locations, $\pi^*/\sigma^*$ ratio in the graphitic region varied from 0.7-0.95, which might have originated from the non-uniform functionalization of CNTs. Also, the ratio was higher than the previous MWCNT EELS mapping, which was likely due to higher initial sp2 bonding in CNT, which provided higher electrical conductivity and smaller disorder related D-bands from the Raman.

The invention claimed is:

1. A method of forming a composite material, the method comprising:
   providing two or more carbon nanotube yarns;
   filament winding the two or more carbon nanotube yarns to form a first material layer comprising the two or more carbon nanotube yarns;
   contacting the two or more carbon nanotube yarns with a resin during at least a portion of the filament winding;
   applying a first stretching force to the first material layer to form a stretched first material layer, wherein the first stretching force is effective to extend a length of the first material layer by about 2% to about 3%;
   removing the first stretching force from the stretched first material layer;
   applying a second stretching force to the stretched first material layer to form an aligned first material layer, wherein the second stretching force is effective to extend a length of the stretched first material layer by about 2% to about 3%;
   removing the second stretching force from the aligned first material layer; and
   applying a third stretching force to the aligned first material layer, wherein the third stretching force is effective to extend a length of the aligned first material layer by about 0.1% to about 3%; and
   curing the resin at least partially while the third stretching force is applied to the aligned first material layer to form the composite material.

2. The method of claim 1, further comprising filament winding the two or more carbon nanotube yarns to form a second material layer comprising the two or more carbon nanotube yarns, wherein the second material layer is arranged on and in contact with the first material layer.

3. The method of claim 1, wherein the filament winding comprises winding the two or more carbon nanotube yarns about a stretching tool with the aid of an automatic filament winder.

4. The method of claim 1, wherein the contacting of the two or more carbon nanotube yarns with the resin at least partially penetrates the two or more carbon nanotube yarns with the resin.

5. The method of claim 1, wherein the resin comprises a bismaleimide.

6. The method of claim 1, wherein the first stretching force is applied (i) to the first material layer for about 5 minutes to about 15 minutes, and/or (ii) while the first material layer is exposed to a temperature of about 50° C. to about 90° C.

7. The method of claim 1, wherein the second stretching force is applied (i) to the stretched first material layer for about 5 minutes to about 15 minutes, and/or (ii) while the stretched first material layer is exposed to a temperature of about 50° C. to about 90° C.

8. The method of claim 1, wherein the removing of the first stretching force from the stretched first material layer comprises removing the first stretching force for about 1 minute to about 3 minutes.

9. The method of claim 1, wherein the two or more carbon nanotube yarns comprise spun carbon nanotube yarns.

10. The method of claim 1, wherein the two or more carbon nanotube yarns comprise unspun carbon nanotube yarns.

11. The method of claim 1, further comprising oxidizing a surface of the two or more carbon nanotube yarns by plasma oxidation prior to the filament winding.

12. The method of claim 1, further comprising functionalizing the two or more carbon nanotube yarns by chemical functionalization prior to the filament winding.

13. The method of claim 12, wherein the functionalizing comprises contacting the two or more carbon nanotube yarns with an acid.

14. The method of claim 1, further comprising:
annealing the two or more carbon nanotube yarns; and
contacting the two or more carbon nanotube yarns with an acid prior to the filament winding.

15. A method of forming a composite material, the method comprising:
providing two or more carbon nanotube yarns;
filament winding the two or more carbon nanotube yarns to form a first material layer comprising the two or more carbon nanotube yarns;
contacting the two or more carbon nanotube yarns with a resin during at least a portion of the filament winding;
applying a first stretching force to the first material layer for about 5 minutes to about 15 minutes to form a stretched first material layer, wherein the first stretching force is effective to extend a length of the first material layer by about 2% to about 3%, and the first stretching force is applied while the first material layer is exposed to a temperature of about 50° C. to about 90° C.;
removing the first stretching force from the stretched first material layer for about 1 minute to about 3 minutes;
applying a second stretching force to the stretched first material layer for about 5 minutes to about 15 minutes to form an aligned first material layer, wherein the second stretching force is effective to extend a length of the stretched first material layer by about 2% to about 3%, and the second stretching force is applied while the stretched first material layer is exposed to a temperature of about 50° C. to about 90° C.;
removing the second stretching force from the aligned first material layer; and
applying a third stretching force to the aligned first material layer, and curing the resin while the third stretching force is applied to the aligned first material layer to form the composite material, wherein the third stretching force is effective to extend a length of the aligned first material layer by about 0.1% to about 3%.

* * * * *